United States Patent
Engelke et al.

(10) Patent No.: US 7,164,753 B2
(45) Date of Patent: Jan. 16, 2007

(54) REAL-TIME TRANSCRIPTION CORRECTION SYSTEM

(75) Inventors: Robert M. Engelke, Madison, WI (US); Kevin R. Colwell, Middleton, WI (US); Troy D. Vitek, Madison, WI (US); Kurt M. Grittner, Madison, WI (US); Jayne M. Turner, Madison, WI (US); Pamela A. Frazier, Mount Horeb, WI (US)

(73) Assignee: Ultratec, Incl, Madison, WI (US)

( * ) Notice: Subject to any disclaimer, the term of this patent is extended or adjusted under 35 U.S.C. 154(b) by 353 days.

(21) Appl. No.: 10/436,650

(22) Filed: May 13, 2003

(65) Prior Publication Data

US 2003/0212547 A1 Nov. 13, 2003

Related U.S. Application Data

(63) Continuation-in-part of application No. 09/789,120, filed on Feb. 20, 2001, now Pat. No. 6,567,503, which is a continuation-in-part of application No. 09/288,420, filed on Apr. 8, 1999, now Pat. No. 6,233,314.

(51) Int. Cl.
   *H04M 1/64* (2006.01)
(52) U.S. Cl. .................... 379/88.01; 379/52; 379/88.14
(58) Field of Classification Search .................. 379/24, 379/52, 88.14, 127.01, 265.02; 345/473; 386/46; 704/200; 715/835
   See application file for complete search history.

(56) References Cited

U.S. PATENT DOCUMENTS

| | | | |
|---|---|---|---|
| 5,210,689 A * | 5/1993 | Baker et al. ................... 704/1 |
| 5,214,428 A * | 5/1993 | Allen ........................... 341/20 |
| 5,216,702 A * | 6/1993 | Ramsden ...................... 379/24 |
| 5,475,733 A * | 12/1995 | Eisdorfer et al. ............. 379/52 |
| 5,712,901 A | 1/1998 | Meermans |
| 5,724,405 A | 3/1998 | Engelke et al. |
| 5,809,112 A * | 9/1998 | Ryan ............................ 379/52 |
| 5,905,476 A | 5/1999 | McLaughlin et al. |
| 5,909,482 A | 6/1999 | Engelke |
| 5,974,116 A | 10/1999 | Engelke et al. |
| 6,075,534 A * | 6/2000 | VanBuskirk et al. ......... 715/835 |
| 6,175,819 B1 | 1/2001 | Van Alstine |
| 6,233,314 B1 | 5/2001 | Engelke |
| 6,314,396 B1 * | 11/2001 | Monkowski ................. 704/233 |
| 6,324,507 B1 * | 11/2001 | Lewis et al. ................. 704/243 |

FOREIGN PATENT DOCUMENTS

| | | |
|---|---|---|
| JP | 6035497 | 2/1994 |
| JP | 9044183 | 2/1997 |

\* cited by examiner

*Primary Examiner*—Gerald Gauthier
(74) *Attorney, Agent, or Firm*—Quarles & Brady LLP

(57) ABSTRACT

A voice transcription system employing a speech engine to transcribe spoken words, detects the spelled entry of words via keyboard or voice to invoke a database of common words attempting to complete the word before all the letters have been input. This database is separate from the database of words used by the speech engine. A voice level indicator is presented to the operator to help the operator keep his or her voice in the ideal range of the speech engine.

12 Claims, 5 Drawing Sheets

REAL-TIME TRANSCRIPTION CORRECTION SYSTEM

CROSS-REFERENCE TO RELATED APPLICATIONS

This application is a continuation in part of Ser. No. 09/789,120 filed Feb. 20, 2001, now U.S. Pat. No. 6,567,503 which is a continuation-in-part on Ser. No. 09/288,420 filed Apr. 8, 1999 now U.S. Pat. No. 6,233,314 which is a continuation of U.S. Pat. No. 5,909,482 filed Sep. 8, 1997.

STATEMENT REGARDING FEDERALLY SPONSORED RESEARCH OR DEVELOPMENT

BACKGROUND OF THE INVENTION

The present invention relates to systems for transcribing voice communications into text and specifically to a system facilitating real-time editing of a transcribed text stream by a human call assistant for higher accuracy.

A system for real-time transcription of remotely spoken voice signals is described in U.S. Pat. No. 5,909,482 assigned to the same assignee as the present invention and hereby incorporated by reference. This system may find use implementing both a "captel" (caption telephone) in which a user receives both voice and transcribed text through a "relay" from a remote second party to a conversation, and a "personal interpreter" in which a user receives, through the relay, a text transcription of words originating from a second party at the location of the user.

In either case, a human "call assistant" at the relay listens to the voice signal and "revoices" the words to a speech recognition computer program tuned to that call assistant's voice. Revoicing is an operation in which the call assistant repeats, in slightly delayed fashion, the words she or he hears. The text output by the speech recognition system is then transmitted to the captel or personal interpreter. Revoicing by the call assistant overcomes a current limitation of computer speech recognition programs that they currently need to be trained to a particular speaker and thus, cannot currently handle direct translation of speech from a variety of users.

Even with revoicing and a trained call assistant, some transcription errors may occur, and therefore, the above-referenced patent also discloses an editing system in which the transcribed text is displayed on a computer screen for review by the call assistant.

BRIEF SUMMARY OF THE INVENTION

The present invention provides for a number of improvements in the editing system described in the above-referenced patent to speed and simplify the editing process and thus generally improve the speed and accuracy of the transcription. Most generally, the invention allows the call assistant to select those words for editing based on their screen location, most simply by touching the word on the screen. Lines of text are preserved intact as they scroll off the screen to assist in tracking individual words and words on the screen change color to indicate their status for editing and transmission. The delay before transmission of transcribed text may be adjusted, for example, dynamically based on error rates, perceptual rules, or call assistant or user preference.

The invention may be used with voice carryover in a caption telephone application or for a personal interpreter or for a variety of transcription purposes. As described in the parent application, the transcribed voice signal may be buffered to allow the call assistant to accommodate varying transcription rates, however, the present invention also provides more sophisticated control of this buffering by the call assistant, for example adding a foot control pedal, a graphic buffer gauge and automatic buffering with invocation of the editing process. Further, the buffered voice signal may be processed for "silence compression" removing periods of silence. How aggressively silence is removed may be made a function of the amount of signal buffered.

The invention further contemplates the use of keyboard or screen entry of certain standard text in conjunction with revoicing particularly for initial words of a sentence which tend to repeat.

The above aspects of the inventions are not intended to define the scope of the invention for which purpose claims are provided. Not all embodiments of the invention will include all of these features.

In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

Figure 1:
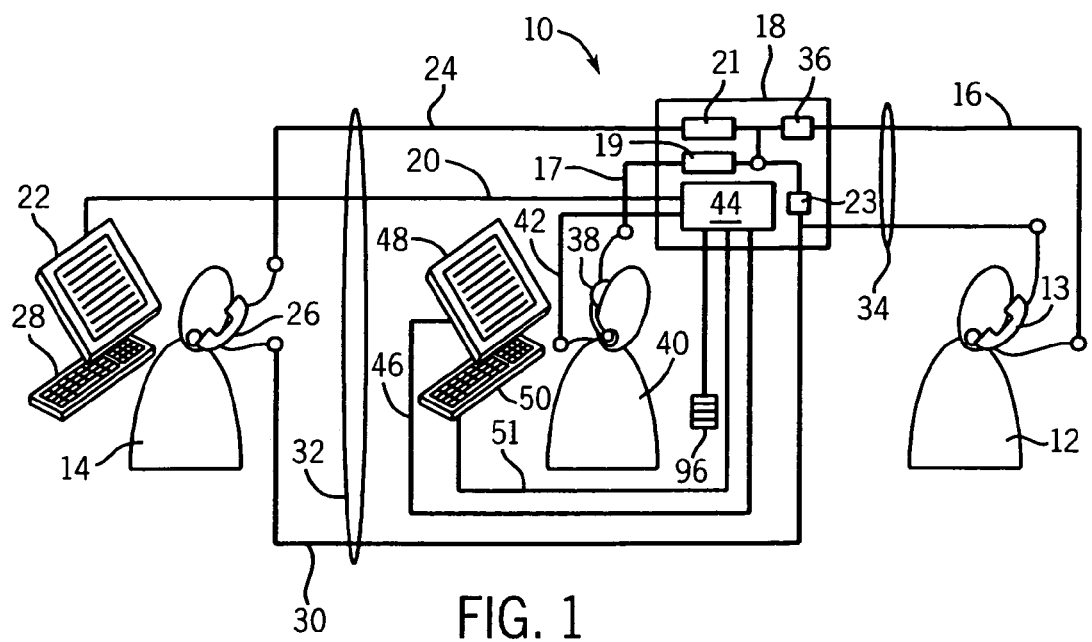
FIG. 1 is a schematic diagram of a voice relay used with a captioned telephone such as may make use of the present invention and showing a call assistant receiving a voice signal for revoicing to a computer speech recognition program and reviewing the transcribed text on a display terminal.

Referring now to FIG. 1, a relay 10, permitting a hearing user 12 to converse with a deaf or hearing-impaired user 14, receives a voice signal 16 from the mouthpiece of handset 13 of the hearing user 12. The voice signal 16 may include a calling number identification (ANI data) as is understood in the art identifying the call originator or an electronic serial number (ESN) or other ANI data. The voice signal 16 is processed by the relay 10 to produce a text stream signal 20 sent to the deaf or hearing-impaired user 14 where it is displayed at a user terminal 22. The caller identification number or other data is stripped off to be used as described below. Optionally, a modified voice signal 24 may also be provided to the earpiece of a handset 26 used by the deaf or hearing-impaired user 14.

The deaf or hearing-impaired user 14 may reply via a keyboard 28 per conventional relay operation through a connection (not shown for clarity) or may reply by spoken word into the mouthpiece of handset 26 to produce voice signal 30. The voice signal 30 is transmitted directly to the earpiece of handset 13 of the hearing user 12.

The various signals 24, 20 and 30 may travel through a single conductor 32 (by frequency division multiplexing or data multiplexing techniques known in the art) or may be separate conductors. Equally, the voice signal 30 and voice signal 16 may be a single telephone line 34 or may be multiple lines.

In operation, the relay 10 receives the voice signal 16 at computer 18 through an automatic gain control 36 providing an adjustment in gain to compensate for various attenuations of the voice signal 16 in its transmission. It is then combined with an attenuated version of the voice signal 30 (the other half of the conversation) arriving via attenuator 23. The voice signal 30 provides the call assistant 40 with context for a transcribed portion of the conversation. The attenuator 23 modifies the voice signal 30 so as to allow the call assistant 40 to clearly distinguish it from the principal transcribed conversation from user 12. Other forms of discriminating between these two voices may be provided including, for example, slight pitch shifting or filtering.

The combined voice signals 16 and 30 are then received by a "digital tape recorder" 19 and output after buffering by the recorder 19 as headphone signal 17 to the earpiece of a headset 38 worn by a call assistant 40. The recorder 19 can be controlled by a foot pedal 96 communicating with computer 18. The call assistant 40, hearing the voice signal 16, revoices it by speaking the same words into the mouthpiece of the headset 38. The call assistant's speech signal 42 are received by a speech processor system 44, to be described, which provides an editing text signal 46 to the call assistant display 48 indicating a transcription of the call assistant's voice as well as other control outputs and may receive keyboard input from call assistant keyboard 50.

The voice signal 16 after passing through the automatic gain control 36 is also received by a delay circuit 21, which delays it to produce the delayed, modified voice signal 24 provided to the earpiece of a handset 26 used by the deaf or hearing impaired user 14.

Figure 2:
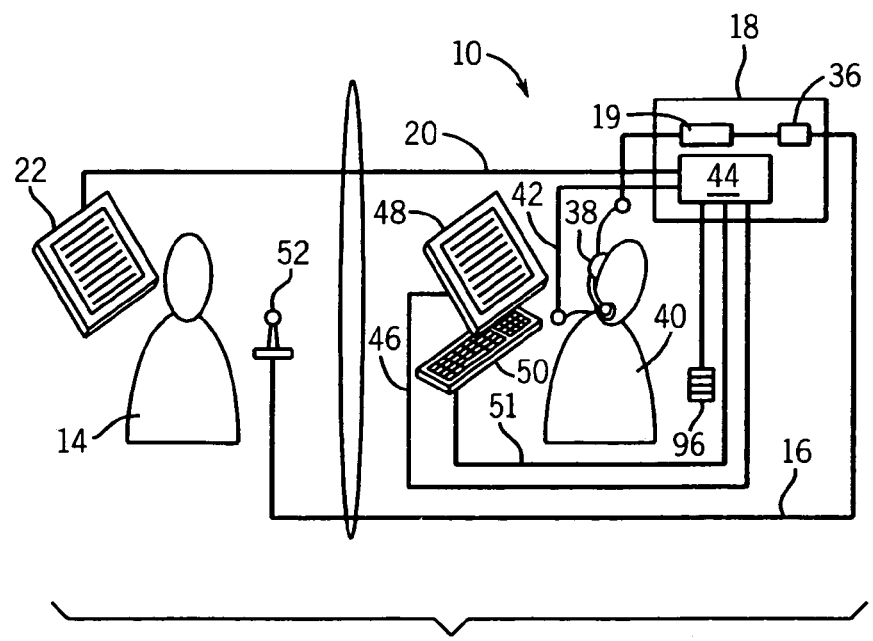
FIG. 2 is a figure similar to that of FIG. 1 showing a relay used to implement a personal interpreter in which the speech signal and the return text are received and transmitted to a single location.

Referring now to FIG. 2, the relay 10 may also be used with a deaf or hearing-impaired individual 14 using a personal interpreter. In this case a voice signal from a source proximate to the deaf or hearing-impaired user 14 is received by a microphone 52 and relayed to the computer 18 as the voice signal 16. That signal 16 (as buffered by recorder 19) is again received by the earpiece of headset 38 of the call assistant 40 who revoices it as a speech signal 42.

In both the examples of FIGS. 1 and 2, the speech signal 40 from the call assistant 40 are received by speech processor system 44 which produces an editing text signal 46 separately and prior to text stream signal 20. The editing text signal 46 causes text to appear on call assistant display 48 that may be reviewed by the call assistant 40 for possible correction using voicing or the keyboard 50 prior to being converted to a text stream signal 20.

Figure 4:
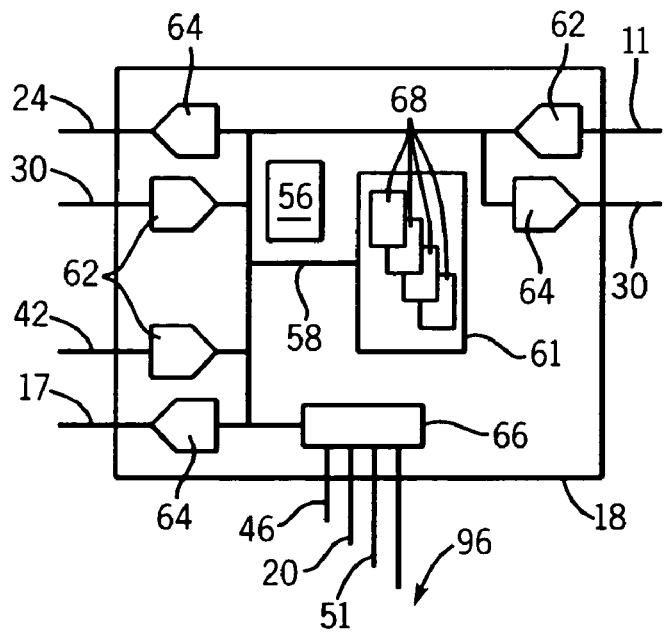
FIG. 4 is a generalized block diagram of the computer system of FIGS. 1 and 2 used for one possible implementation of the present invention according to a stored program.

Referring now to FIG. 4, the relay computer 18 may be implemented by an electronic processor 56 possibly including one or more conventional microprocessors and a digital signal processor joined on a bus 58 with a memory 60. The bus 58 may also communicate with various analog to digital converters 62 providing for inputs for signals 16, 30 and 42, various digital to analog converters 64 providing outputs for signals 30, 24 and 17 as well as digital I/O circuits 66 providing inputs for keyboard signal 51 and foot pedal 96 and outputs for text stream signal 20 and pre-edited editing text signal 46. It will be recognized that the various functions to be described herein may be implemented in various combinations of hardware and software according engineering choice based on ever changing speeds and costs of hardware and software.

Figure 8:
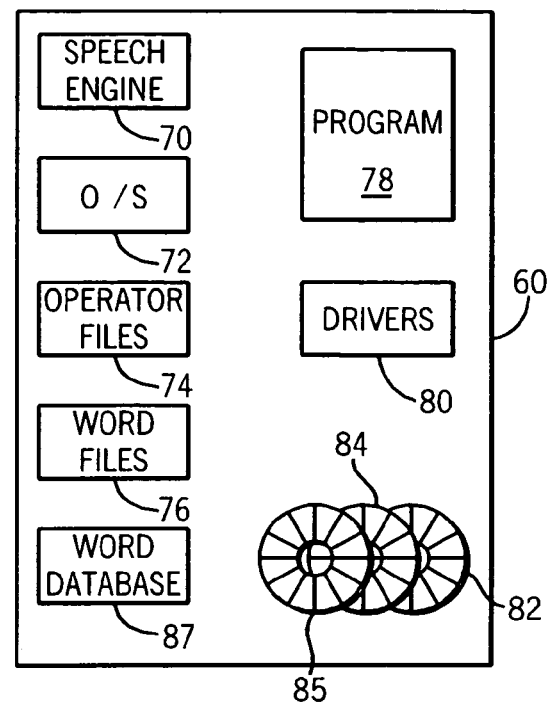
FIG. 8 is a graphical representation of the memory of the computer of FIG. 4 showing data structures and programs used in the implementation of the present invention.

Referring now to FIG. 8, the memory 60 includes a variety of programs and data structures including speech recognition program 70, such as the Via Voice program manufactured by the IBM Corporation, of a type well known in the art. The speech recognition program 70 operates under an operating system 72, such as the Windows operating system manufactured by the Microsoft Corporation, also known in the art. The speech recognition program 70 creates files 74 and 76 as part of its training to a particular speaker and to the text it is likely to receive. File 74 is a call assistant specific file relating generally to the pronunciation of the particular call assistant. File 76 is call assistant independent and relates to the vocabulary or statistical frequency of word use that will be transcribed text—dependant on the pool of callers not the call assistant 40. File 76 will be shared among multiple call assistants in contrast to conventions for typical training of a speech recognition program 70, however, file 74 will be unique to and used by only one call assistant 40 and thus is duplicated (not shown) for a relay having multiple call assistants 40.

The memory 60 also includes program 78 of the present invention providing for the editing features and other aspects of the invention as will be described below and various drivers 80 providing communication of text and sound and keystrokes with the various peripherals described under the operating system 72. Memory 60 also provides a circular buffer 82 implementing recorder 19, circular buffer 84 implementing delay 21 (both shown in FIG. 1) and circular buffer 85 providing a queue for transcribed text prior to transmission. Operation of these buffers is under control of the program 78 as will be described below.

Memory also includes a common word database 87 as will be described below.

Figure 5:
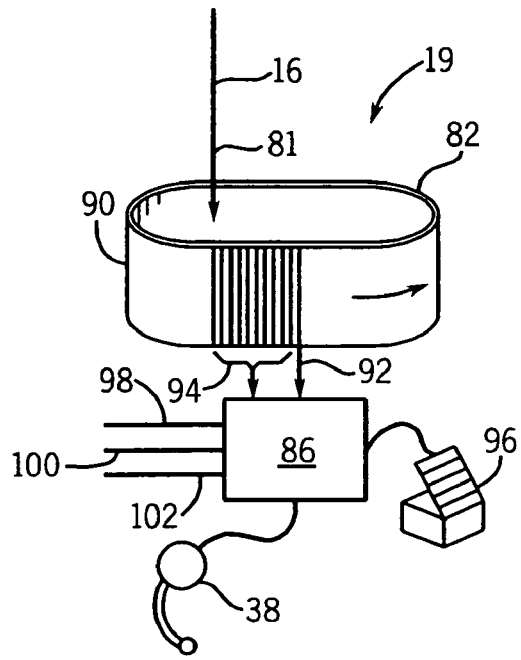
FIG. 5 is a pictorial representation of a buffer system receiving a voice signal prior to transcription by the call assistant such as may be implemented by the computer of FIG. 4.

Referring now to FIGS. 1 and 5, the voice signal 16 as received by the recorder, as circular buffer 82 then passes through a silence suppression block 86 implemented by program 78. Generally, as voice signal 16 is received, it is output to circular buffer 82 at a record point determined by a record pointer 81 to be recorded in the circular buffer 82 as a series of digital words 90. As determined by a playback pointer 92, these digital words 90, somewhat later in the circular buffer 82, are read and converted by means of digital to analog converter 64 into headphone signal 17 communicated to headset 38. Thus, the call assistant 40 may occasionally pause the playback of the headphone signal 17 without loss of voice signal 16 which is recorded by the circular buffer 82. The difference between the record pointer 81 and the playback pointer 92 defines the buffer fill length 94 which is relayed to the silence suppression block 86.

Figure 3:
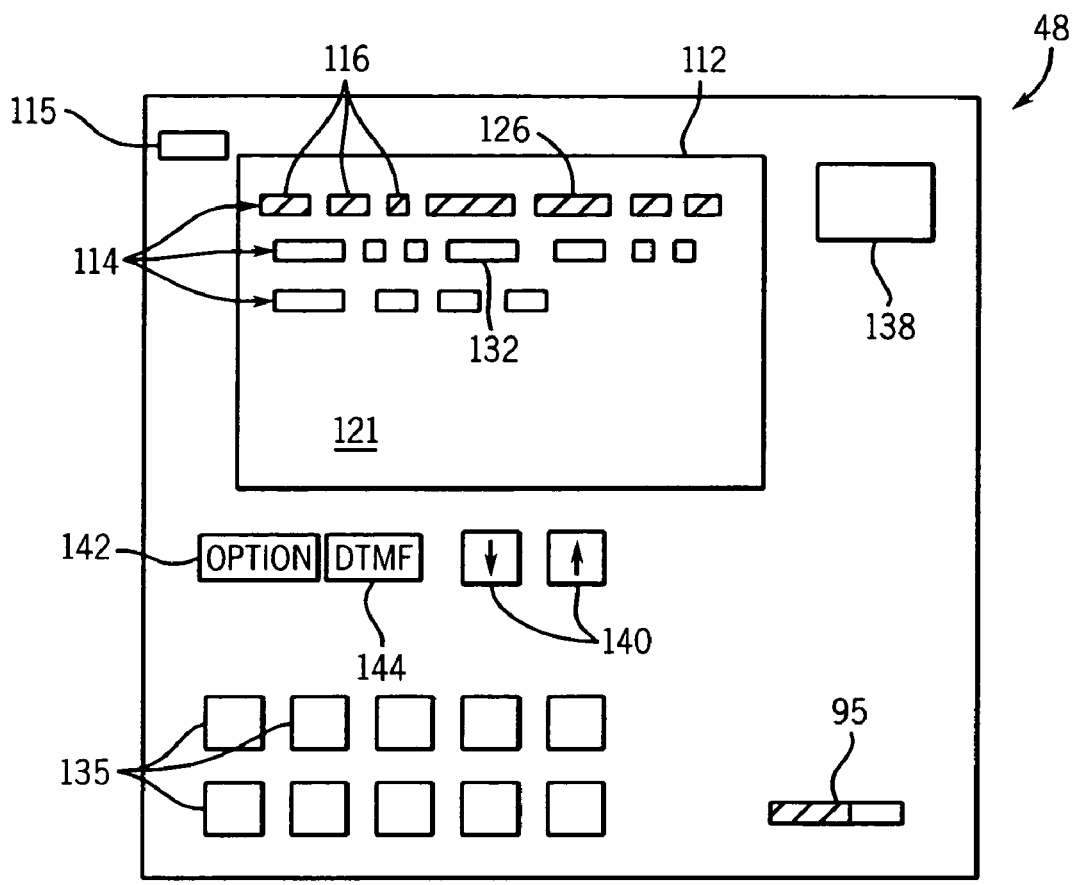
FIG. 3 is a simplified elevational view of the terminal of FIGS. 1 and 2 as viewed by the call assistant.

The buffer fill length 94 may be displayed on the call assistant display 48 shown in FIG. 3 by means of a bar graph 95 having a total width corresponding to total size of the circular buffer 82 and a colored portion concerning the buffer fill length 94. Alternatively, a simple numerical percentage display may be provided. In this way the call assistant may keep tabs of how far behind she or he is in revoicing text.

The foot pedal 96 may be used to control movement of the playback pointer 92 in much the same way as a conventional office dictation unit. While the foot pedal 96 is released, the playback pointer 92 moves through the circular buffer 82 at normal playback speeds. When the pedal is depressed, playback pointer 92 stops and when it is released, playback pointer 92 backs up in the buffer 82 by a predetermined amount and then proceeds forward at normal playing speeds. Depression of the foot pedal 96 may thus be used to pause or replay difficult words.

As the buffer fill length 94 increases beyond a predetermined amount, the silence suppression block 86 may be activated to read the digital words 90 between the record pointer 81 and playback pointer 92 to detect silences and to remove those silences, thus shortening the amount of buffered data and allowing the call assistant to catch up to the conversation. In this regard, the silence suppression block 86 reviews the digital words 90 between the playback pointer 92 and the record pointer 81 for those indicating an amplitude of signal less than a predetermined squelch value. If a duration of consecutive digital words 90 having less than the squelch value, is found exceeding a predetermined time limit, this silence portion is removed from the circular buffer 82 and replaced with a shorter silence period being the minimum necessary for clear distinction between words. The silence suppression block 86 then adjusts the playback pointer 92 to reflect the shortening of the buffer fill length 94.

As described above, in a preferred embodiment, the silence suppression block 86 is activated only after the buffer fill length 94 exceeds a predetermined volume. However, it may alternatively be activated on a semi-continuous basis using increasingly aggressive silence removing parameters as the buffer fill length 94 increases. A squelch level 98, a minimum silence period 100, and a silence replacement value 102 may be adjusted as inputs to this silence suppression block 86 as implemented by program 78.

Figure 6:
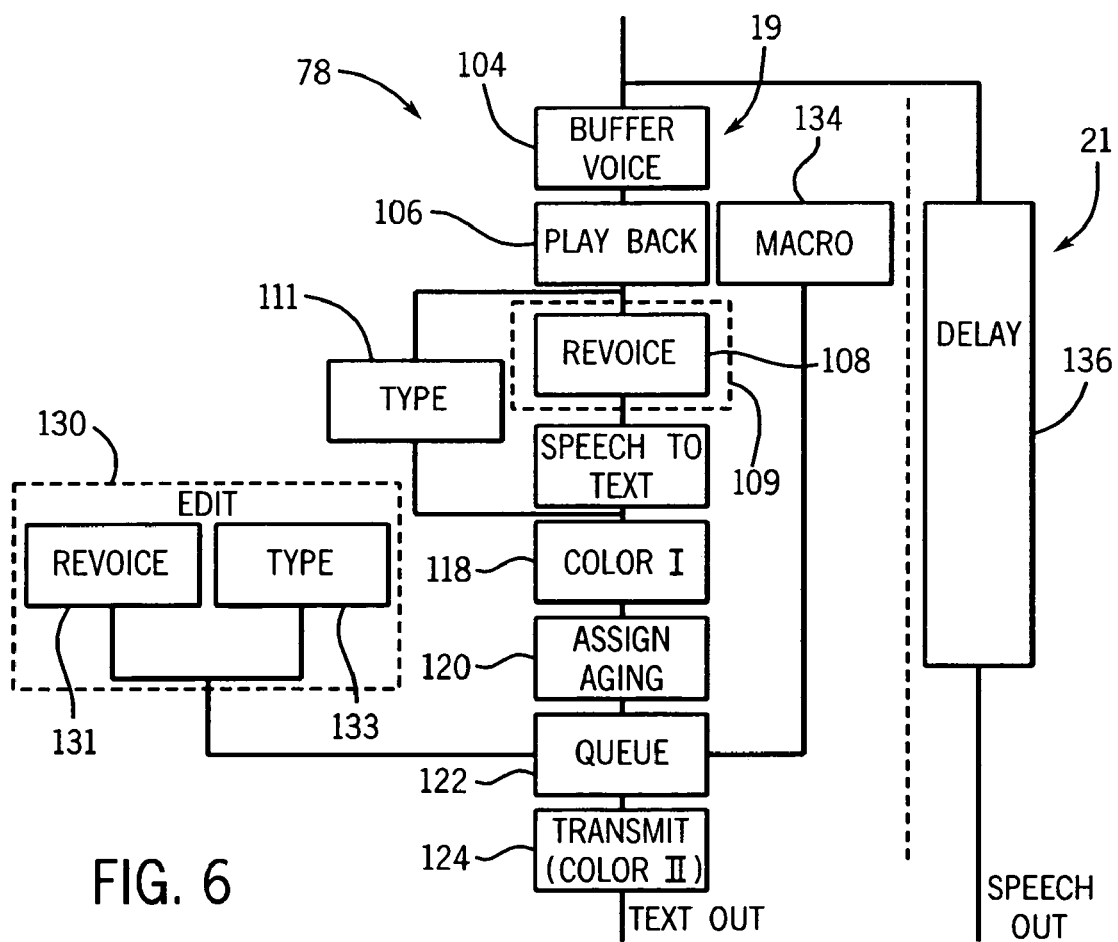
FIG. 6 is a flowchart showing the elements of the program of FIG. 4 such as may realize the present invention including controlling the aging of transcribed text prior to transmission.

Referring now to FIG. 6, after the program 78 receives the voice signal 16 onto circular buffer 82 as indicated by process block 104, provided the call assistant has not depressed the pedal 96, the headphone signal 17 is played back as indicated by process block 106 to be received by the call assistant 40 and revoiced as indicated by process block 108, a process outside the program as indicated by the dotted line 109. The program 78 then connects the speech signal 42 from the call assistant 40 to the speech recognition program 70 as indicated by process block 110 where it is converted to text and displayed on the call assistant display 48.

During the revoicing, the call assistant 40 may encounter a word expected to be unlikely to be properly recognized by the speech engine. In this case, as indicated by process block 111, the call assistant 40 may simply type the word in providing text in an alternative fashion to normal revoicing. The program 78 may detect this change in entry mode and attempt to aid the call assistant in entering the word as will be described below.

Referring now to FIGS. 1 and 4, the speech signal 42 from the call assistant 40 is processed by a digital signal processor being part of the electronic processor 56 and may produce a voice level display 115 shown in the upper left hand corner of the display 48. To avoid distracting the call assistant 40, the voice level display 115 does not display instantaneous voice level in a bar graph form or the like but presents, in the preferred embodiment, simply a colored rectangle whose color changes categorize the call assistant's voice volume into one of three ranges. The first range denotes a voice volume too low for accurate transcription by the speech processor system 44 and is indicated by coloring the voice level display 115 to the background color of the display 48 so that the voice level display 115 essentially disappears. This state instructs the call assistant 40 to speak louder or alerts the call assistant 40 to a broken wire or disconnected microphone.

The second state is a green coloring and indicates that the voice volume of the call assistant 40 is proper for accurate transcription by the speech processor system 44.

The third state is a red coloring of the voice level display 115 and indicates that the voice volume of the call assistant 40 is too loud for accurate transcription by the speech processor system 44. The red coloring may be stippled, that is of non-uniform texture, to provide additional visual clues to those call assistants 40 who may be colorblind.

Figure 10:
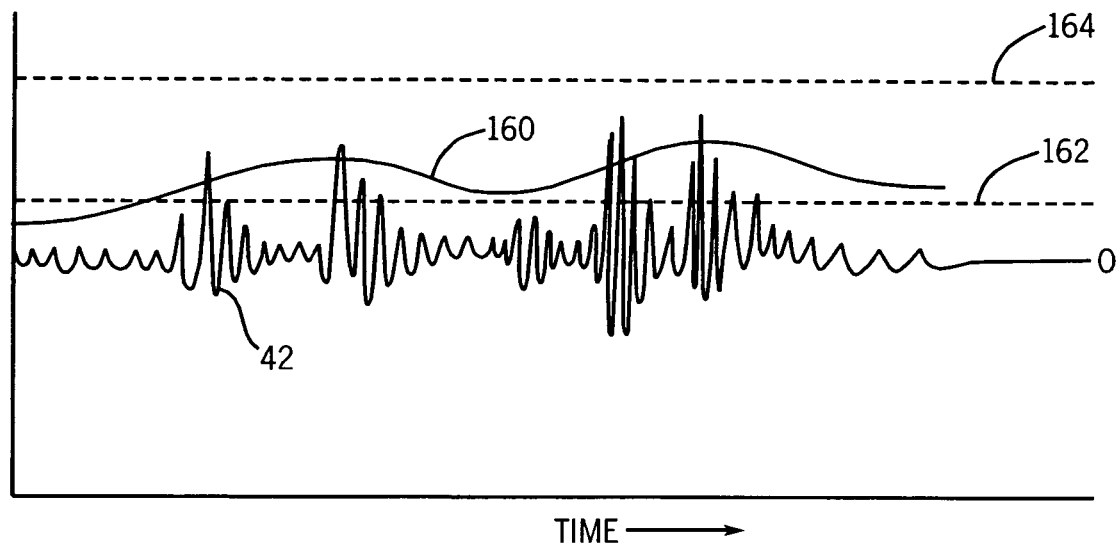
FIG. 10 is a plot of the voice signal from a call assistant as is processed to provide a voice level indicator.

Referring to FIG. 10, it is desirable that the voice level display 115 provide an intuitive indication of the speaking volume of the speech signal 40 without unnecessary variation that might distract the call assistant 40, for example, as might be the case if the voice level display 115 followed the instantaneous voice power. For this reason, the digital signal processor is used to provide an amplitude signal 160 following an average power of the speech signal 40. The amplitude signal 160 is processed by thresholding circuitry which may be implemented by the digital signal processor or other computer circuitry to determine which state of the voice level is appropriate. The thresholding circuit uses a low threshold 162 placed at the bottom range at which accurate speech recognition can be obtained and a high threshold 164 at the top of the range at which accurate speech recognition can be obtained. These thresholds 162 and 164 may be determined empirically or by use of calibration routines included with the speech recognition software.

When the amplitude signal 160 is between the high and low thresholds 164 and 162, the proper volume has been maintained by the call assistant 40 and the voice level display 115 shows green. When the amplitude signal 160 is below the low threshold 162, insufficient volume has been provided by the call assistant 40 and the voice level display 115 disappears. When the amplitude signal 160 is above the high threshold 164, excessive volume has been provided by the call assistant 40 and the voice level display 115 shows red.

In an alternative embodiment, the speech processor system 44 may receive the voice signal 16 directly from the user 12. In this case, the voice signal 16 is routed directly to the digital signal processor that is part of the electronic processor 56 and provides the basis for the voice level display 115 instead of the voice of the call assistant 40, but in the same manner as described above. The call assistant 40 may monitor the voice level display 115 to make a decision about initiating revoicing, for example, if the voice level display 115 is consistently low.

Referring now to FIG. 3, the text is displayed within a window 112 on the call assistant display 48 and arranged into lines 114. The lines 114 organize individual text words 116 into a left to right order as in a book and preserves a horizontal dimension of placement as the lines 114 move upward ultimately off of the window 112 in a scrolling fashion as text is received and transmitted. Preserving the integrity of the lines allows the call assistant 40 to more easily track the location of an individual word 116 during the scrolling action.

The most recently generated text, per process block 110 or 111 of FIG. 6, is displayed on the lowermost line 114 which forms on a word-by-word basis.

At process block 118, the words 121 of the lowermost line are given a first color (indicated in FIG. 3 by a lack of shading) which conveys that they have not yet been transmitted to the deaf or hearing-impaired individual 14.

At process block 120 the words are assigned an aging value indicating how long they will be retained in a circular buffer 85 prior to being transmitted and hence how long they will remain the first color. The assignment of the aging values can be dynamic or static according to values input by the call assistant 40 as will be described below.

As indicated by process block 122, the circular buffer 85 forms a queue holding the words prior to transmission.

At process block 124, the words are transmitted after their aging and this transmission is indicated changing their representation on the display 48 to a second color 126, indicated by crosshatching in FIG. 3. Note that even after transmission, the words are still displayed so as to provide continuity to the call assistant 40 in tracking the conversation in text form.

Prior to the words being colored the second color 126 and transmitted (thus while the words are still in the queue 122), a correction of transcription errors may occur. For example, as indicated by process block 130, the call assistant 40 may invoke an editing routine by selecting one of the words in the window 112, typically by touching the word as it is displayed and detecting that touch using a touch screen. Alternatively, the touch screen may be replaced with more conventional cursor control devices. The particular touched word 132 is flagged in the queue and the activation of the editing process by the touch causes a stopping of the playback pointer 92 automatically until the editing process is complete.

Once a word is selected, the call assistant 40 may voice a new word (indicated by process block 131) to replace the flagged word or type in a new word (indicated by process block 132) or use another conventional text entry technique to replace the word in the queue indicated by process block 122. The mapping of words to spatial locations by the window 112 allows the word to be quickly identified and replaced while it is being dynamically moved through the queue according to its assigned aging. When the replacement word is entered, the recorder 19 resumes playing.

As an alternative to the playback and editing processes indicated by process block 106 and 130, the call assistant 40 may enter text through a macro key 135 as indicated by process block 134. These macro keys 135 place predetermined words or phrases into the queue with the touch of the macro key 135. The words or phrases may include conversational macros, such as words placed in parentheses to indicate nonliteral context, such as (holding), indicating that the user is waiting for someone to come online, (sounds) indicating nonspoken sounds necessary to understand a context, and the (unclear) indicating a word is not easily understood by the call assistant. Similarly, the macros may include call progress macros such as those indicating that an answering machine has been reached or that the phone is ringing. Importantly, the macros may include common initial words of a sentence or phrase, such as "okay", "but", "hello", "oh", "yes", "um", "so", "well", "no", and "bye" both to allow these words to be efficiently entered by the call assistant 40 without revoicing.

The macro keys 135 for common initial words allow these words to be processed with reduced delay of the speech to text step 110 and error correction of editing process block 130. It has been found that users are most sensitive to delay in the appearance of these initial words and thus that reducing them much improves the comprehensibility and reduces frustration in the use of the system.

The voice signal received by the buffer as indicated by process block 104 is also received by a delay line 136 implemented by circular buffer 84 and adjusted to provide delay in the voice so that the voice signal arrives at the caption telephone or personal interpreter at approximately the same time as the text. This synchronizing reduces confusion by the user.

Referring now to FIG. 3, the call assistant display 48 operating under the control of the program 78 may provide for a status indicator 138 indicating the status of the hardware in making connections to the various users and may include the volume control buttons 140 allowing the call assistant 40 to independently adjust the volume of the spoken words up or down for his or her preference. An option button 142 allows the call assistant to control the various parameters of the editing and speech recognition process.

A DTMF button 144 allows the call assistant to directly enter DTMF tones, for example, as may be needed for a navigation through a menu system. Pressing of the button 144 converts the macro key 135 to a keypad on a temporary basis.

Figure 7:
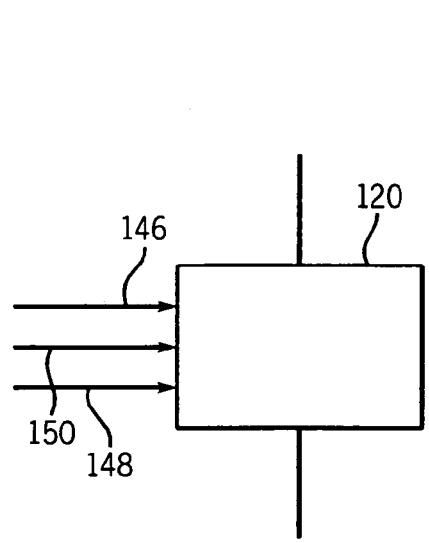
FIG. 7 is a detailed view of one flowchart block of FIG. 6 such as controls the aging of text showing various inputs that may affect the aging time.

Referring now to FIG. 7, the assignment of aging of text per process block 120 may be functionally dependant on several parameters. The first parameter 146 is the location of the particular word within a block of the conversation or sentence. It has been found that reduced delay (aging) in the transmission of these words whether or not they are entered through the macro process 134 or the revoicing of process block 108, decreases consumer confusion and frustration by reducing the apparent delay in the processing.

Error rates, as determined from the invocation of the editing process of process block 130 may be used to also increase the aging per input 148. As mentioned, the call assistant may control the aging through the option button 142 shown in FIG. 3 (indicated by input 150) with inexperienced call assistants 40 selecting for increased aging time.

Figure 9:
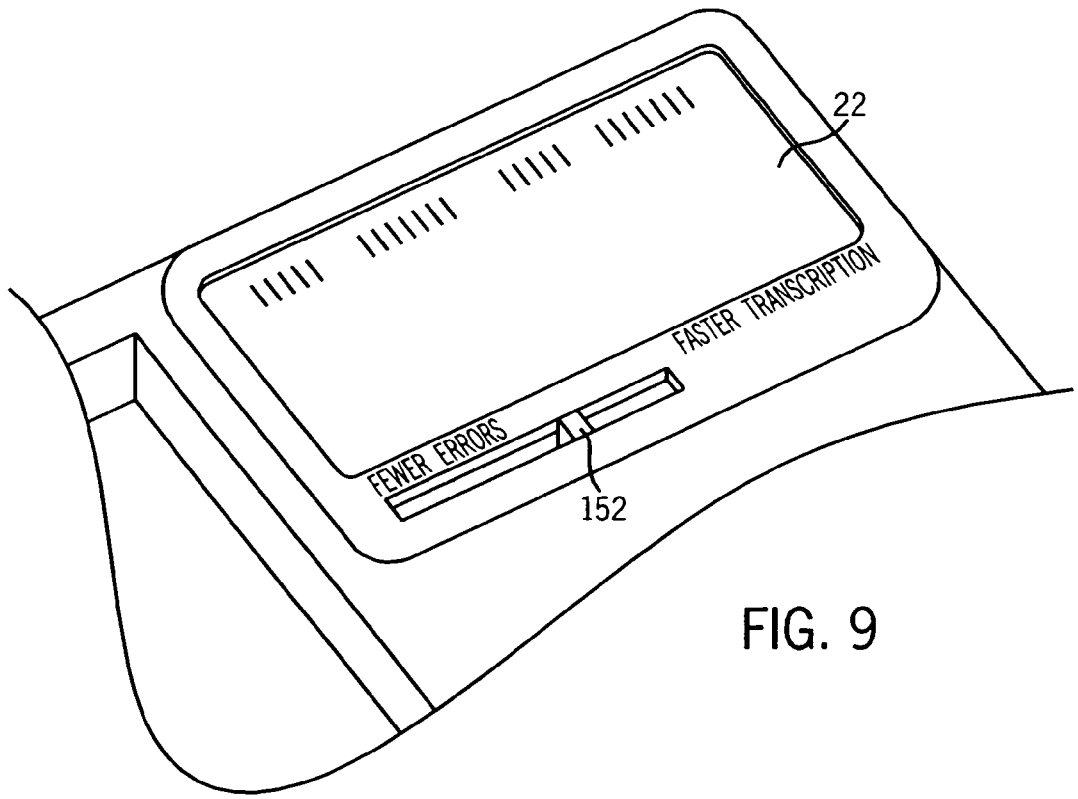
FIG. 9 is a fragmentary view of a caption telephone of FIG. 1 showing a possible implementation of a user control for controlling a transcription speed accuracy tradeoff.

Importantly, the deaf or hearing-impaired user 14 may also control this aging time. Referring to FIG. 9, the user terminal 22 may include, for example, a slider control 152 providing for a range of locations between a "faster transcription" setting at one end and "fewer errors" setting at the other end. Thus the user may control the aging time to mark a preference between a few errors but faster transcription or much more precise transcription at the expense of some delay.

It will be understood that the mechanisms described above may also be realized in collections of discrete hardware rather than in an integrated electronic computer according to methods well known in the art.

It should be noted that the present invention provides utility even against the expectation of increased accuracy in computer speech recognition and it is therefore considered to cover applications where the call assistant may perform no or little revoicing while using the editing mechanisms described above to correct for machine transcription errors.

It will be understood that the digital tape recorder 19, including the foot pedal 96 and the silence suppression block 86 can be equally used with a conventional relay in which the call assistant 40 receiving a voice signal through the headset 38 types, rather than revoices, the signal into a conventional keyboard 50. In this case the interaction of the digital tape recorder 19 and the editing process may be response to keyboard editing commands (backspace etc) rather than the touch screen system described above. A display may be used to provide the bar graph 95 to the same purposes as that described above.

Figure 11:
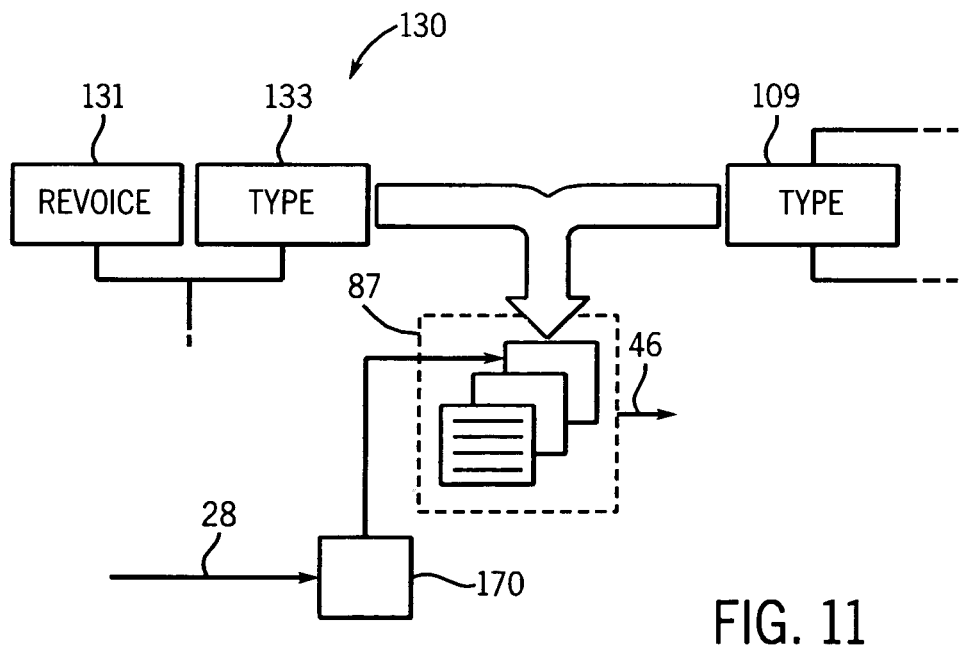
FIG. 11 is a fragmentary view of FIG. 6 showing an auto-complete feature operating when the call assistant must spell out a word.

Referring now to FIGS. 4 and 11, keystrokes or their spoken equivalent, forming sequential letter or character inputs from the call assistant 40 during the processes described above of process blocks 111, 133, and 131, are forwarded on a real time basis to a call assistant input circuit formed by the digital I/O circuit 66 receiving keystrokes 51 or an internal connection between the speech recognition program 70 and a program 78 implementing the present invention (shown in FIG. 8). The call assistant input circuit also provides for a reception of the caller number identification or another user identification number such as an electronically readable serial number on the captel or phone used by the speaker.

As the call assistant 40 types or spells a word, the call assistant input circuit so formed, queries the database 87 for words beginning with the letters input so far, selecting when there are multiple such words, the most frequently used word as determined by a frequency value also stored with the words as will be described. This word selected immediately appears on the display 48 for review by the call assistant 40. If the desired word is displayed, the call assistant 40 may cease typing and accept the word displayed by pressing the enter key. If the wrong word has been selected from the database 87, the call assistant 40 simply continues spelling, an implicit rejection causing the database 87 to be queried again using the new letters until the correct word has been found or the word has been fully spelled and entered. In the former case, the frequency of the word stored in the database 87 is incremented. In the later case, the new word is entered into the database 87 with a frequency of one. At the end of the call, the database 87 is deleted.

This process of anticipating the word being input by the call assistant 40 may be used by the call assistant 40 either in editing her or his own revoicing or in monitoring and correcting a direct voice-to-speech conversion of the caller's voice.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A voice transcription system comprising:
   an input circuit receiving a voice signal of spoken words from a remote source;
   a speech engine generating input text including first text words corresponding to the spoken words;
   a call assistant input circuit receiving at least one letter input for second text words from a call assistant monitoring at least one of the voice signal and the input text, the call assistant input circuit including multiple sets of second text words to select an anticipated second text word from the letter input prior to indication by the call assistant of completion of the second text word;
   a display device to display the anticipated second text word to the call assistant; and
   an output circuit transmitting at least one of the first text words and the second text word to a remote user.

2. The voice transcription system of claim 1 wherein the display device is further configured to display the input text as printed text; and
   wherein the call assistant input circuit includes a means for the call assistant to accept or reject the displayed second text word.

3. The voice transcription system of claim 2 wherein the displayed second word is rejected upon receipt by the call assistant input circuit receiving an additional letter input not conforming to the displayed second text word.

4. The voice transcription system of claim 3 wherein upon a rejection of the displayed second word by receipt of an additional letter input not conforming to the displayed second text word, the call assistant input circuit selects a new second text word from the multiple sets of second words.

5. The voice transcription system of claim 2 wherein the display device provides a touch screen identifying a point of touch on the screen and wherein the displayed second word is accepted by a touch of the screen at a location of the displayed second word.

6. The voice transcription system of claim 2 wherein the displayed second word is accepted by entry of a designated entry character.

7. The voice transcription system of claim 6 wherein the designated entry character is an enter key on a keyboard.

8. The voice transcription system of claim 1 wherein the call assistant input circuit accepts typed letter input from the call assistant via a keyboard.

9. The voice transcription system of claim 1 wherein the call assistant input circuit accepts spoken letter input from the call assistant via the speech engine.

10. The voice transcription system of claim 1 wherein the memory includes multiple sets of second words and wherein the input circuit further receives a remote source identifier to select from among the sets of second words for selecting a second word.

11. The voice transcription system of claim 1 wherein the remote identifier is a caller identification number.

12. The voice transcription system of claim 1 wherein the remote identifier is an electronically readable serial number of a telephone device.

\* \* \* \* \*